(12) United States Patent
Okanishi et al.

(10) Patent No.: US 6,476,144 B1
(45) Date of Patent: Nov. 5, 2002

(54) SPHERULITE-MICRONIZING AGENT FOR CRYSTALLINE FLUORORESIN CRYSTALLINE FLUORORESIN COMPOSITION CONTAINING MICRONIZING AGENT

(75) Inventors: Ken Okanishi, Settsu (JP); Minoru Yoshida, Settsu (JP); Tatsuo Suzuki, Settsu (JP); Tetsuo Shimizu, Settsu (JP); Takahisa Aoyama, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/463,777

(22) PCT Filed: May 25, 1999

(86) PCT No.: PCT/JP99/02750

§ 371 (c)(1),
(2), (4) Date: Jan. 28, 2000

(87) PCT Pub. No.: WO99/62999

PCT Pub. Date: Dec. 9, 1999

(30) Foreign Application Priority Data

May 29, 1998 (JP) .............................................. 10-149250

(51) Int. Cl.[7] ...................... C08F 293/00; C08F 259/00; C08F 214/20; C08L 53/00
(52) U.S. Cl. ...................... 525/200; 525/199; 525/276; 526/247; 524/544; 524/545; 524/546
(58) Field of Search ................................. 525/200, 199, 525/276; 526/247; 524/544, 545, 546

(56) References Cited

U.S. PATENT DOCUMENTS 4,713,418 A * 12/1987 Logothetis et al.
5,024,881 A * 6/1991 Matucha et al. ............. 428/323
5,605,971 A    2/1997 Arcella et al.
5,612,419 A    3/1997 Arcella
5,919,878 A * 7/1999 Brothers et al. ............. 526/247

FOREIGN PATENT DOCUMENTS

| EP | 1 029 875 A1 | 8/2000 | |
| JP | 2-36251 | 2/1990 | |
| JP | 05144325 A * | 11/1991 | ............ C09D/5/25 |
| JP | 7-237257 | 9/1995 | |
| JP | 8-41267 | 2/1996 | |
| JP | 8-73689 | 3/1996 | |
| JP | 9-316266 | 12/1997 | |

OTHER PUBLICATIONS

Database Chemabs Online!; Chemical Abstracts Service Columbus, Ohio, US; retrieved from STN; Database accession No. 124:148280 HCA XP002171560 *abstract* & JP 07 292200 A (Mitsui Deyuhon Furorokemikaru KK, Japan); Nov. 7, 1995.

* cited by examiner

*Primary Examiner*—James J. Seidleck
*Assistant Examiner*—Olga Asinovsky
(74) *Attorney, Agent, or Firm*—Armstrong, Westerman & Hattori, LLP

(57) ABSTRACT

Spherulites in a molded article obtained from a melt-processable crystalline fluorine-containing resin composition are minimized to give the transparent molded article having a smooth surface and being resistant to contamination. An agent for minimizing spherulite size which comprises an amorphous fluorine-containing polymer or a fluorine-containing multi-segment polymer. The fluorine-containing multi-segment polymer comprises an amorphous segment and a crystalline segment.

12 Claims, No Drawings

SPHERULITE-MICRONIZING AGENT FOR CRYSTALLINE FLUORORESIN CRYSTALLINE FLUORORESIN COMPOSITION CONTAINING MICRONIZING AGENT

TECHNICAL FIELD

The present invention relates to an agent which minimizes a size of spherulites in a melt-processable crystalline fluorine-containing resin and can make a surface of a molded article smooth, a crystalline fluorine-containing resin composition containing the agent for minimizing spherulite size and a molded article obtained from the composition. The molded article of the present invention has a smooth surface and can be used suitably for various products, parts and containers in the field of semi-conductor manufacturing equipment.

BACKGROUND ART

Melt-processable crystalline fluorine-containing resins are excellent, in heat resistance, chemical resistance and the like, and are used widely as a molding material in various fields. Particularly crystalline tetrafluoroethylene/perfluoro (alkyl vinyl ether) copolymer (PFA) is from the viewpoint of its excellent chemical and thermal stability and moldability, used as a material for a sheet, tube, joint, container, carrier, bellows, seal, etc. in the field of production of semi-conductors which is required to be free from contamination. In such a field of production of semi-conductors, as mentioned above, contamination by impurities and foreign matters (particles) is extremely required to be avoided, and it is required to make inside of equipment and inner surfaces of pipe and container as smooth as possible because particles are easily accumulated there.

However since PFA is a crystalline melt-processable resin, relatively large spherulites exist in a molded article obtained by melt-molding the resin. If many of such relatively large spherulites exist, it prevents a surface of the molded article from becoming smooth.

It is known that spherulites of PFA can be made smaller by increasing the number of nucleuses of spherulites, and basically the following two methods for minimizing a size of spherulite have been studied.

One is a method for blending polytetrafluoroethylene (PTFE) as an agent for forming a nucleus of spherulite into a PFA composition (JP-A-7-70397, JP-A-7-237257, JP-A-7-292200, JP-A-9-316266). There are two proposals of blending, as an additive, PTFE having a crystallization temperature of not less than 305° C. and a crystallization calorie of not less than 50 J/g or PTFE crosslinked with ionizing radiation.

Another one is a method for blending, as a nucleus-forming agent, PFA having a low molecular weight or PFA having a low copolymerizing ratio of a perfluoro(alkyl vinyl ether) (PAVE) unit (JP-A-8-41267, JP-A-8-73689, JP-A-8-109225).

However in those methods, since crystallization temperatures of PFA having a low copolymerizing ratio of a PAVE unit and PFA having a low molecular weight are lower than that of PTFE, sufficient number of spherulite nucleuses are not formed and a spherulite size is not minimized sufficiently.

According to the method for blending PTFE as an agent for minimizing spherulite size into a PFA composition, though a spherulite size is minimized and through sight of an obtained molded article is improved, the molded article is wholly whity and transparency is not enough.

An object of the present invention is to provide the agent for minimizing size of spherulite in a melt-processable crystalline fluorine-containing resin such as PFA. The agent can not only minimize the size of spherulite in the resin and make highly smooth a surface of molded article obtained by melt-molding the resin but also decrease generation of particles.

While the conventional approaches are based on the use of highly crystalline agents for minimizing spherulite size such as PTFE and PFA having a high content of tetrafluoroethylene (TFE), the present inventors have made intensive studies as to converse approach, that is, use of an amorphous fluorine-containing polymer which has been considered not to be able to become a crystalline nucleus from a common-sense point of view. As a result, the present inventors have found that unexpectedly an amorphous fluorine-containing polymer has an excellent function of minimizing a spherulite size. Thus the present invention was completed. Though the reason for that is not clear, it is assumed that an amorphous fluorine-containing polymer decreases a growing speed of spherulite of a crystalline fluorine-containing resin and even in case of slow cooling, crystallization completes without growing the spherulite, and thus a size of produced spherulite is minimized.

DISCLOSURE OF THE INVENTION

Namely the agent of the present invention for minimizing spherulite size of a melt-processable crystalline fluorine-containing resin comprises an amorphous fluorine-containing polymer, preferably an amorphous fluorine-containing polymer having a glass transition temperature of not more than 25° C.

As such an amorphous fluorine-containing polymer, there can be used selectively one having a compatibility with a crystalline fluorine-containing resin.

In case of minimizing spherulite size of a crystalline PFA as a crystalline fluorine-containing resin, a preferred amorphous fluorine-containing polymer to be used is an amorphous tetrafluoroethylene/perfluoro(alkyl vinyl ether) copolymer.

Also as the agent for minimizing spherulite size of the present invention, there can be used one which contains a fluorine-containing multi-segment polymer comprising (A) an amorphous fluorine-containing polymer chain segment and (B) a crystalline fluorine-containing polymer chain segment comprising 80 to 100% by mole of tetrafluoroethylene (TFE) recurring unit and 0 to 20% by mole of a recurring unit represented by the formula (I):

$$CF_2=CF-RF_f^1 \qquad (I)$$

wherein $R_f^1$ is $CF_3$ or $OR_f^2$, in which $R_f^2$ is a perfluoroalkyl group having 1 to 5 carbon atoms.

In that case, the crystalline fluorine-containing polymer chain segment (B) may be a polymer chain segment consisting of TFE recurring unit or a polymer chain segment comprising TFE recurring unit and perfluoro(alkyl vinyl ether) (PAVE) recurring unit and containing PAVE in an amount of not more than 20% by mole.

In case where a crystalline PFA is used as a crystalline fluorine-containing resin, a preferred minimizing agent of spherulite size is an amorphous tetrafluoroethylene/perfluoro(alkyl vinyl ether) copolymer or a fluorine-containing multi-segment polymer consisting of TFE recurring unit as the segment (B).

Thermal stability is improved by fluorinating those amorphous fluorine-containing polymer and fluorine-containing multi-segment polymer.

In case of minimizing spherulite size of vinylidene fluoride polymer (PvdF), examples of the amorphous fluorine-containing polymer to be used are, for instance, fluorine-containing elastomers having hydrogen atom such as vinylidene fluoride/hexafluoropropylene copolymer, vinylidene fluoride/hexafluoropropylene/tetrafluoroethylene copolymer, vinylidene fluoride/chlorotrifluoroethylene copolymer and vinylidene fluoride/chlorotrifluoroethylene/tetrafluoroethylene copolymer. Also there can be used the agent for minimizing spherulite size which contains a fluorine-containing multi-segment polymer having such an amorphous fluorine-containing polymer in its segment.

In case of a chlorotrifluoroethylene polymer (PCTFE), examples of the amorphous fluorine-containing polymer to be used are, for instance, vinylidene fluoride/chlorotrifluoroethylene copolymer, vinylidene fluoride/chlorotrifluoroethylene/tetrafluoroethylene copolymer, and the like. Also there can be used the agent for minimizing spherulite size which contains a fluorine-containing multi-segment polymer having such an amorphous fluorine-containing polymer in its segment.

The present invention also relates to the crystalline fluorine-containing resin composition prepared by blending those minimizing agents of spherulite size into a melt-processable crystalline fluorine-containing resin.

It is preferable that the minimizing agent is blended in an amount of 0.1 to 50 parts (part by weight, hereinafter the same) on the basis of 100 parts of the crystalline fluorine-containing resin.

Examples of the preferred melt-processable crystalline fluorine-containing resin are crystalline PFA (PAVE content: not more, than 15% by weight), particularly PFA having a TFE/PAVE ratio of 90/10 to 99/1 in % by weight and a TFE/PAVE ratio of 96.0/4.0 to 99.6/0.4 in % by mole from the viewpoint of maintaining a high melting point.

Further the present invention relates to a molded article, for example, a tube, container, etc. obtained by melt-molding the above-mentioned crystalline fluorine-containing resin. It is preferable that the obtained molded article is one containing spherulites having an average spherulite size of not more than 5 $\mu$m.

BEST MODE FOR CARRYING OUT THE INVENTION

A major feature of the minimizing agent of spherulite size of the present invention is to use an amorphous fluorine-containing polymer or a fluorine-containing multi-segment polymer having an amorphous fluorine-containing polymer chain segment.

In the present invention, "amorphous" means that when measuring with a differential scanning calorimeter (DSC), there is neither a melting peak temperature (Tm at heating) nor a crystallizing peak temperature (Tc at temperature decreasing) but there is observed a glass transition temperature (Tg). In other words, it means that there is no crystalline region substantially. On the other hand, "crystalline" means that there are observed Tm and Tc.

Further the "amorphous" segment (A) and "crystalline" segment (SB) of the fluorine-containing multi-segment polymer are such segments that the polymers having the same recurring units as those of the respective segments satisfy the above-mentioned. definitions of "amorphous" and "crystalline", respectively.

The crystalline fluorine-containing resin to be used in the present invention is a resin which is melt-processable and forms coarse spherulites at crystallizing. Therefore PTFE is excluded. Examples of the resin are, for instance, PFA (PAVE content: 1 to 10% by weight), PVdF, chlorotrifluoroethylene polymer (PCTFE), and the like. The minimizing agent of spherulite size of the present invention can be suitably used particularly for a crystalline PFA which is strongly required to give smoothness from the viewpoint of its application.

The amorphous fluorine-containing polymer and amorphous fluorine-containing polymer chain segment (A) in the fluorine-containing multi-segrment polymer which are used in the present invention have a glass transition temperature (Tg). An amorphous polymer having Tg of not more than room temperature (25° C.) is called an elastomer and one having Tg exceeding 25° C. is called a resin. Use of an elastomer having Tg of not more than 25° C. is preferable from the point that an effect of minimizing spherulite size is large, and the elastomer can be selected depending on its compatibility with a crystalline fluorine-containing resin to be used. However in the present invention, as the amorphous fluorine-containing polymer or amorphous fluorine-containing polymer chain segment (A), either of an elastomer having Tg of not more than 25° C. and: a resin having Tg exceeding 25° C. may be used.

As the minimizing agent of the present invention, there are one comprising an amorphous fluorine-containing polymer and one comprising a fluorine-containing multi-segment polymer. First the former one comprising an amorphous fluorine-containing polymer is explained below.

As the amorphous fluorine-containing polymer, there are a fluorine-containing elastomer having Tg of not more than 25° C. and an amorphous fluorine-containing polymer resin having Tg exceeding 25° C.

Examples of the fluorine-containing elastomer are, for instance, perfluoro elastomers such as tetrafluoroethylene/perfluoro(alkyl vinyl ether) copolymer; fluorine-containing elastomers having hydrogen atom such as vinylidene fluoride/hexafluoropropylene copolymer, vinylidene fluoride/hexafluoropropylene/tetrafluoroethylene copolymer, vinylidene fluoride/chlorotrifluoroethylene copolymer and vinylidene fluoride/chlorotrifluoroethylene/tetrafluoroethylene copolymer; and the like.

Among them, TFE/PAVE copolymer is preferred as the minimizing agent of spherulite size of PFA from the viewpoint of its compatibility with PFA. Examples of perfluoro(alkyl vinyl ether) (PAVE) to be used for the TFE/PAVE copolymer are perfluoro(methyl vinyl ether), perfluoro(ethyl vinyl ether), perfluoro(propyl vinyl ether), and the like. A content of PAVE is from 10 to 50% by mole, preferably from 20 to 50% by mole which is an amount where the TFE/PAVE copolymer has neither Tm nor Tc. A boundary between amorphous and crystalline is in the range of 10 to 20% by mole. If a polymer is amorphous in that range, the polymer can be used as the minimizing agent.

A fluorine-containing elastomer can be prepared by a process known as a process for preparing a fluorine-containing rubber (JP-B-58-4728, JP-A-62-12734).

For example, there is a process for emulsion-polymerizing the above-mentioned fluorine-containing monomer under pressure with stirring in an aqueous medium substantially under oxygen-free condition in the presence of an iodine compound, preferably diiodine compound and a radical polymerization initiator.

Represented examples of the diiodine compound are, for instance, 1,3-diiodoperfluoropropane, 1,4- diiodoperfluorobutane, 1,3-diiodo-2-chloroperfluoropropane, 1,5-diiodo-2,4-dichloroperfluoropentane, 1,6-diiodoperfluorohexane, 1,8-diiodoperfluorooctane, 1,12-diiodoperfluorododecane, 1,16-diiodoperfluorohexadecane, diiodomethane, 1,2-diiodoethane, and the like. Those compounds may be used solely and can be used in combination with each other. Among them, 1,4-diiodoperfluorobutane is preferred. An amount of the diiodo compound is from 0.01 to 1% by weight on the basis of the whole amount of fluorine-containing monomers.

Also in the present invention, it is possible to copolymerize an iodine-containing monomer with the fluorine-containing elastomer. As an iodine-containing monomer, perfluoro(vinyl ether) compounds are suitable from the viewpoint of its copolymerizability. For example, perfluoro(6,6dihydro-6-iodo-3-oxa-1-hexene, perfluoro(5-iodo-3-oxa-1-pentene), and the like which are disclosed in JP-B-5-63482 and JP-A-62-12734 are suitable.

A polymerization temperature can be changed in the range of from about 10° C. to about 100° C. depending on property of an initiator to be used and a monomer. However at a temperature lower than 40° C., a polymerization speed is low in case of using a persulfate solely. Also even in case of using a redox initiator containing sulfite, or the like, it is not preferable for an application for production of semiconductors because the polymerization speed is low and besides a metal ion of a reducing agent remains in a polymer.

A radical polymerization initiator to be used may be the same as that which has been used for polymerization of a fluorine-containing elastomer. Examples of those initiators are organic and inorganic peroxides and azo compounds. Represented initiators are persulfates, carbonate peroxides, peroxide esters, and the like, and a preferred initiator is an ammonium persulfate (APS). APS may be used solely and can be used in combination with a reducing agent such as sulfites. In case where cleanliness is required, it is preferable not to use an initiator giving a metal ion, if possible.

In emulsion polymerization, various emulsifying agents can be used. Desirable are salts of carboxylic acid having a fluorocarbon chain or fluoropolyether chain from the viewpoint of preventing a chain transfer reaction with molecules of the emulsifying agent from arising during the polymerization. It is desirable that an amount of the emulsifying agent is from about 0.05% by weight to about 2% by weight, particularly from 0.2 to 1.5% by weight on the basis of added water.

A polymerization pressure can be changed in a wide range, usually in the range of from 0.5 to 5 MPa. The higher the polymerization pressure is, the higher the polymerization speed is. Therefore the polymerization pressure is desirably not less than 0.8 MPa from the viewpoint of an increase in production.

It is preferable that a number average molecular weight of the so-obtained fluorine-containing elastomer is from 5,000 to 750,000, further from 20,000 to 400,000, particularly from 50,000 to 400,000, from the viewpoint of good mixing with a crystalline fluorine-containing resin.

Examples of the amorphous fluorine-containing polymer resin having Tg exceeding 25° C. are amorphous fluorine-containing polymers having a ring structure on a trunk chain thereof, for example, tetrafluoroethylene/fluorodioxole copolymers (cf. JP-B-63-18964, for example, tetrafluoroethylene/fluoro-2,2-dimethyl- 1,3-dioxole copolymer, and the like); amorphous fluorine-containing polymers having a fluorine-containing alicyclic ring in its trunk chain and prepared by ring-forming polymerization of a fluorine-containing monomer having at least two polymerizable double bonds (for example, polymers obtained by ring-forming polymerization of perfluoro monomers such as perfluoro(allyl vinyl ether) and perfluoro(butenyl vinyl ether); or copolymers of those perfluoro monomers with radically polymerizable monomers such as tetrafluoroethylene, chlorotrifluoroethylene and perfluoro (alkyl vinyl ether)), and the like. Among them, from the viewpoint of heat resistance and chemical resistance, amorphous perfluoro polymers such as tetrafluoroethylene/perfluoro-2,2-dimethyl-1,3-dioxole copolymer and perfluoro(allyl vinyl ether) polymer are preferred.

Then the fluorine-containing multi-segment polymer is explained below.

The fluorine-containing multi-segment polymer to be used as the minimizing agent of spherulite size in the present invention comprises the amorphous fluorine-containing polymer chain segment (A) and the crystalline fluorine-containing polymer chain segment (B).

As the amorphous fluorine-containing polymer chain segment (A), there are elastomeric segment and resinous segment like the above-mentioned amorphous fluorine-containing polymer.

The elastomeric fluorine-containing polymer chain segment (A) is a segment having Tg of not more than 25° C., for example, copolymers raised above as the fluorine-containing elastomers and can be prepared by the above-mentioned iodine transfer polymerization. In case of preparation by iodine transfer polymerization, an end of the segment is of perhalo type having iodine atom, and is used as a site for initiating the block copolymerization with the crystalline fluorine-containing polymer chain segment (B).

It is preferable that a number average molecular weight of the elastomeric fluorine-containing polymer chain segment (A) is from 5,000 to 750,000, further from 20,000 to 400,000, particularly from 50,000 to 400,000.

A particularly preferred segment as the elastomeric fluorine-containing polymer chain segment (A) is an elastomeric tetrafluoroethylene (TFE)/perfluoro(alkyl vinyl ether) (PAVE) segment comprising a TFE recurring unit and a PAVE recurring unit. In that case, a content of the PAVE recurring unit is an amount where the segment has Tg of not more than 25° C. and does not have Tm and Tc, namely 10 to 50% by mole, preferably 20 to 50% by mole. A boundary between amorphous and crystalline is in the range of 10 to 20% by mole, and the segment in the amorphous range is used.

In case where the fluorine-containing multi-segment polymer is mixed to the matrix fluorine-containing resin, the crystalline fluorine-containing polymer chain segment (B) functions as an anchor so that the amorphous segment (A) does not become a particle and is not falling away from the matrix resin. Accordingly, the crystalline segment (B) is selected from those having good compatibility with the crystalline fluorine-containing resin. Concretely the crystalline segment (B) comprises a tetrafluoroethylene (TFE) recurring unit and a recurring unit represented by the formula (I):

$$CF_2=CF-R_f^1 \qquad (I)$$

wherein $R_f^1$ is $CF_3$ or $OR_f^2$, in which $R_f^2$ is a perfluoroalkyl group having 1 to 5 carbon atoms. The recurring unit represented by the formula (I) is contained in an amount of not more than 20% by mole, preferably from 0 to 10% by mole, more preferably from 0 to 4% by mole. The amount of the recurring unit of the formula (I) exceeding 20% by mole is not preferable because the segment becomes amorphous and an anchor effect is insufficient. A boundary between amorphous and crystalline is in the range of 10 to 20% by mole, and the crystalline segment is used.

Examples of the monomer represented by the formula (I) are, for instance, hexafluoropropylene (HFP) and perfluoro (alkyl vinyl ether) (PAVE). Examples of PAVE are perfluoro (methyl vinyl ether) (PMVE), perfluoro(ethyl vinyl ether) (PEVE), perfluoro(propyl vinyl ether) (PPVE), and the like, and from the viewpoint of good compatibility with PFA, PPVE is particularly preferred.

Example of a particularly preferred crystalline segment (B) is a PTFE segment consisting a TFE recurring unit or a crystalline PFA segment.

The block copolymerization of the crystalline segment (B) with the amorphous segment (A) can be carried out, subsequently to emulsion polymerization of the amorphous segment (A), by changing to the monomer for the crystalline segment (B). A number average molecular weight of the crystalline segment (B) can be adjusted in a wide range of from 1,000 to 1,200,000, preferably from 3,000 to 400,000, particularly preferably from 10,000 to 400,000.

The so-obtained fluorine-containing multi-segment polymer mainly comprises a polymer molecule (B-A-B) in which the crystalline segments (B) are bonded to both sides of the amorphous segment (A) or a polymer molecule (A-B) in which the crystalline segment (B) is bonded to one side of the amorphous segment (A).

In the present invention, a proportion of the amorphous segment (A) to the crystalline segment (B) in the fluorine-containing multi-segment polymer may be selected in the above-mentioned molecular weight range. For example, a preferred weight ratio of A/B is 10/90 to 99/1, particularly 25/75 to 95/5. Also a molecular weight of the fluorine-containing multi-segment polymer may be one assuring good mixing with the crystalline fluorine-containing resin.

A particularly preferred segmented polymer is one having the following combination of segments.
(1) The amorphous segment (A) is TFE/PMVE (80/20 to 50/50 in % by mole ratio) having a number average molecular weight of 50,000 to 400,000.

The crystalline segment (B) is TFE/PPVE (100/0 to 80/20 in % by mole ratio) having a number average molecular weight of 10,000 to 400,000.

Structure of Segmented Polymer: B-A-B

This segmented polymer is excellent from the points of minimizing a spherulite size of PFA, having an anchor effect and not lowering physical properties of PFA.

Also it is preferable that the minimizing agent of the present invention is subjected to treatment with fluorine gas in order to enhance heat resistance.

The treatment with fluorine gas is carried out by contacting fluorine gas to the minimizing agent. However a reaction with fluorine is very exothermic, and therefore it is proper to dilute fluorine with an inert gas such as nitrogen. An amount of fluorine in the fluorine gas/inert gas mixture is from 1 to 100% by weight, preferably from 10 to 25% by weight. A treating temperature is from 150° to 250° C., preferably from 200° to 250° C., and a fluorine gas treating time is from 3 to 16 hours, preferably from 4 to 12 hours. The gas pressure in treating with fluorine gas is in the range of 1 to 10 atm, and preferably an atmospheric pressure is used. When a reaction vessel is used at atmospheric pressure, the fluorine gas/inert gas mixture may be continuously passed to the reaction vessel. As a result, unstable end in the minimizing agent is converted to —$CF_3$ and becomes thermally stable. Also iodine bonded to the fluorine-containing elastomer and fluorine-containing multi-segment polymer obtained by iodine transfer polymerization can be removed below a detection limit.

The minimizing agent of the present invention can minimize a size of spherulite formed in the crystalline fluorine-containing resin and thus can enhance smoothness of a surface of molded article. Particularly when the fluorine-containing multi-segment polymer is used, falling away of the minimizing agent can be inhibited, which contributes to an increase in cleanliness.

The present invention also relates to the crystalline fluorine-containing resin composition prepared by blending the minimizing agent into a melt,processable crystalline fluorine-containing resin.

The melt-processable crystalline fluorine-containing resin is a fluorine-containing resin having a melting peak temperature (Tm) and crystallizing peak temperature (Tc) which are determined according to DSC, as mentioned above, and forming coarse slpherulites at crystallizing. Examples thereof are crystalline PFA copolymers, PVdF polymers, PCTFE polymers, and the like. Preferred melt-processable crystalline PFA which exhibits a remarkable effect of minimizing spherulite size is a PFA having a PAVE content of not more than 10% by weight (4% by mole) and not less than 1% by weight (0.37% by mole) from the viewpoint of heat resistance and chemical resistance. When more than 10% by weight, a melting point (Tm, Tc) decreases and heat resistance is low. On the other hand, when less than 1% by weight, the resulting polymer is a so-called modified PTFE having no melt-processability. A preferred melt-processable crystalline PFA is one having a melt flow rate (372° C.±1° C., load of 5 kg) of 0.5 to 500 g/10 min, particularly 0.5 to 50 g/10 min. Examples of PAVE are PMVE, PEVE, PPVE, perfluoro(isobutyl vinyl ether), and the like as mentioned above. Particularly PPVE is preferred from the viewpoint of excellent mechanical properties.

It is preferable that an adding amount of the minimizing agent (amount of the amorphous segment (A) in case of the fluorine-containing multi-segment polymer) is from 0.1 to 50 parts on the basis of 100 parts of the crystalline fluorine-containing resin. In the present invention, there is a tendency that the spherulite size decreases when an adding amount of the minimizing agent is increased. However when the amount exceeds 20 parts, there is almost no change in the spherulite size, and when more than 50 parts, hardness and mechanical properties of the obtained crystalline fluorine-containing resin composition are lowered. Therefore an upper limit of the adding amount is 50 parts, particularly 20 parts, further preferably 10 parts. A lower limit thereof is 0.1 part, preferably 0.25 part in which an effect of minimizing spherulite size is obtained.

With respect to an effect of the crystalline segment (B) in case where the fluorine-containing multi-segment polymer is used, there is a tendency that when an amount of the crystalline segment. (B) exceeds 50 parts, crystallinity of the crystalline fluorine-containing resin composition is increased and a tensile strength and flexural endurance of the obtained molded article are lowered.

It is basically better not to add other additives to the resin composition of the present invention which is mainly directed to smoothness of a surface of a molded article. However in the fields other than production of semiconductors, carbon black, titanium oxide, glass fiber, and the like may be added for the purposes of reinforcement and lowering of electrostatic charge.

The crystalline fluorine-containing resin composition of the present in mention can be prepared by known processes such as a process in which the agent for minimizing spherulite size is melt-kneaded with the crystalline fluorine-containing resin to give pellets; a process in which pellets or powder of the agent for minimizing spherulite size and a pellet or powder of crystalline fluorine-containing resin are dry-blended; and a process in which an aqueous dispersion of crystalline fluorine-containing resin and a powder or aqueous dispersion of the agent for minimizing spherulite size are wet-blended and then dried. In addition, the crystalline fluorine-containing resin composition containing the agent for minimizing spherulite size may also be prepared by carrying out the polymerization of crystalline fluorine-containing resin in the presence of fine particles of the agent for minimizing spherulite size in the polymerization system. Among those processes, the melt-kneading process or wet-blending process is preferred from economical point of view and from the point that a uniform composition can be obtained.

The agent for minimizing spherulite size of the present invention is excellent in dispersibility into the crystalline fluorine-containing resin despite that it is amorphous. Particularly the fluorine-containing multi-segment polymer gives a more uniform composition since its crystalline segment enhances affinity (compatibility) more. In case where the agent for minimizing spherulite size is used in the form of an aqueous dispersion, it is preferable that the agent comprises fine particles having an average particle size of from 0.05 to 1 $\mu$m, and in case where the agent for minimizing spherulite size is used in the form of a powder, it is preferable that the agent comprises particles having an average particle size of from several microns to several tens of microns.

Also when the crystalline fluorine-containing resin composition of the present invention is used particularly in the field of production of semi-conductors, it is preferable to carry out the above-mentioned fluorinating treatment in order to stabilize its unstable end group and reduce an amount of elution of fluorine ion (JP-B-8-30097, JP-A-4-20507).

The crystalline fluorine-containing resin composition of the present invention is melt-processable, and various. melt-molding methods such as melt-extrusion molding, injection molding and heat-compression molding can be applied thereto. In those melt-molding methods, spherulites are formed when the crystalline fluorine-containing resin once melted is re-crystallized. By previously blending the agent for minimizing spherulite size of the present invention into the resin, the spherulites to be formed at re-crystallizing can be minimized. For example, in case where a crystalline PFA is slowly cooled under the conditions described hereinafter for measurement of an average size of spherulites, the average size of spherulites is from about 30 $\mu$m to about 60 $\mu$m when the minimizing agent is not blended. But when the minimizing agent of the present invention is blended, the average particle size can be decreased to not more than 20 $\mu$m, particularly not more than 10 $\mu$m.

The present invention then relates to a molded article obtained by melt-molding the above-mentioned crystalline fluorine-containing resin composition. The molded article of the present invention is one having an average spherulite size of not it ore than 5 $\mu$m, and has a smooth surface. Particularly when fluorine-containing resins (PFA, PVdF, and the like) having a poor through sight are used as a matrix resin, not only a through sight is improved but also transparency is enhanced. Therefore the molded article is useful as a material for window for inside observation.

Also when the fluorine-containing multi-segment polymer is used as the minimizing agent, since the crystalline segment makes an anchoring, function, falling away of the minimizing agent is reduced and generation of particles causing contamination can be inhibited.

The molded article of the present invention can have various forms depending on the molding method, for example, the form of a tube, film, sheet, plate, container or parts in compliance with a variety of purposes.

Since those molded articles of the present invention have heat resistance and chemical resistance of the fluorine-containing resin and the surface thereof is smooth, they can be used suitably as various parts, pipes and containers particularly for producing semi-conductors which are required to be free from contamination.

The present invention is then explained by means of examples, but is not limited to them.

In examples and comparative examples, various physical properties are measured, and the methods of measurements are as follows.
(Content of PAVE)

The content of PAVE is calculated by $^{19}$F-NMR method.
(Melting Peak Temperature Tm and Crystallizing Peak Temperature Tc)

Measurement is made with a differential scanning calorimeter (DSC, Model RDC220 available from Seiko Denshi Kabushiki Kaisha) by using a sample of 3 mg. First the sample is heated up from 200° C. to 350° C. at a rate of 10° C./min, and after kept at 350° C. for one minute, cooled down to 200° C. at a rate of 10° C./min. A crystallizing peak temperature (Tc) is determined from a crystallizing curve obtained at that time. Further after the sample is cooled down to 200° C. and kept at 200 ° C. for. one minute, it is again heated up to 350° C. at a rate of 10° C./min. A melting peak temperature (Tm) is determined from a melting curve obtained at that time.
(Glass transition temperature Tg)

The sample of 10 mg is heated up from −70° C. to 110° C. at a rate of 20° C./min, and then cooled down to −70° C. at a rate of 20° C./min by using the above-mentioned differential scanning calorimeter. The sample is again heated up to 110° C. at a rate of 20° C./min. A glass transition temperature (center point) is determined from a curve obtained at that time.
(Average Size of Spherulite)

A disk-like sample sliced to a thickness of about 50 $\mu$m is put on a slide glass which is then mounted on Model FP82HT Hot Stage (available from Mettler-Toledo AG). The sample is melted by heating up to 360° C. at a rate of 40° C./min and held at 360° C. for three minutes, followed by cooling down to 200° C. at a rate of 10° C./min to be re-crystallized. After the sample on the slide glass is removed from the Hot Stage, it is allowed to be cooled down to room temperature. The measurement is made with an optical microscope (×140) by measuring diameters of continuous 30 spherulites among those observed on the surface of the sample while the spherulites are recognized by means of polarized light. The particle size is an average of those 30 spherulites. With respect to the molded article in the form of tube, the surface of the sample is observed with a scanning electron microscope (×1,000 to ×5,000), and the average size of spherulites is determined by measuring diameters of continuous 30 spherulites in the same manner as above.
(Mooney Viscosity: $ML_{1+10}$)

Measurement is made in accordance with JIS K 6300 by using a Mooney viscometer available from Kabushiki Kaisha Ueshima Seisakusho.

(Intrinsic Viscosity: "η")

Intrinsic viscosity is determined by measuring at 35° C. by using FC-75 available from Three M Co., Ltd.

(Melt Flow Rate: MFR)

Measurement is made at 372° C. at a load of 5 kg in accordance with ASTM D 2116.

(Thermogravimetric Analysis)

A weight loss is measured by heating a sample of 10 mg from 20° C. to 600° C. at a rate of 10° C./min with flowing 200 ml of air by using a differential scanning calorimeter (RDC220 available from Seiko Denshi Kabushiki Kaisha).

(Surface Roughness)

A roughness of inner surface of a tube (arithmetic mean roughness (Ra) and maximum height (Ry)) is measured in accordance with JIS-B0601 by using a contact type surface roughness meter (SURFTEST600 available from Kabushiki Kaisha Mitutoyo).

PREPARATION EXAMPLE 1

Synthesis of Amorphous Fluorine-containing Polymer

A 47-liter stainless steel autoclave was charged with 30 liters of pure water, 300 g of $C_7F_{15}COONH_4$ as an emulsifying agent and 300 g of disodium hydrogen phosphate·12H$_2$O as a pH regulator. After the inside of the system was replaced with nitrogen gas sufficiently, the autoclave was heated to 50° C. with stirring at 200 rpm, and a mixed gas of tetrafluoroethylene (TEE) and perfluoro (methyl vinyl ether) (PMVE) (TFE/PMVE=32/68 in mole ratio) was fed so that the inside pressure became 8.0 kgf/cm$^2$G. Then 100 ml of an aqueous solution containing ammonium persulfate (APS) in a concentration of 55.8 mg/ml was fed with pressurized nitrogen to initiate a reaction.

With the advance of the polymerization, at the time when the inside pressure lowered to 7.0 kgf/cm$^2$G, a mixture comprising 27.24 g of diiodine, compound I(CF$_2$)$_4$I and 234 g of an aqueous solution of 10% by weight of $C_7F_{15}COONH_4$ was fed with pressurized nitrogen. Then 60 g of TFE was fed with its self-pressure and 58 g of PMVE was fed under pressure by a plunger pump (TFE/PMVE=63/37 in mole ratio). After that, with the advance of the reaction, TEE and PMVE were fed under pressure in the same manner, and increasing and decreasing of the pressure were repeated between 7 kgf/cm$^2$G and 8 kgf/cm$^2$G.

At the time when a total feeding amount of TEE and PMVE reached 6,000 g twelve hours after the initiation of the polymerization reaction, the autoclave was cooled and an un-reacted monomer was released to give an aqueous dispersion having a solid content of 18.04% by weight.

A part of the aqueous dispersion was sampled, frozen, coagulated and thawed, and a precipitated product was washed with water and vacuum-dried to give an elastomeric polymer. A Mooney viscosity $ML_{1+10}$ (100° C.) of the polymer was 94. An intrinsic viscosity "η" was 0.654 dl/g.

As a result of $^{19}$F-NMR analysis, monomer units of the polymer were TFE/PMVE=60/40 in % by mole, and Tg (center value) measured by DSC analysis was 2° C.

PREPARATION EXAMPLE 2

Synthesis of Amorphous Fluorine-containing Polymer

A 47-liter stainless steel autoclave was charged with 30 liters of pure water, 300 g of $C_7F_{15}COONH_4$ as an emulsifying agent and 300 g of disodium hydrogen phosphate·12H$_2$O as a pH regulator. After the inside of the system was replaced with nitrogen gas sufficiently, the autoclave was heated to 50° C. with stirring at 200 rpm, and a mixed gas of tetrafluoroethylene (TFE) and perfluoro (methyl vinyl ether) (PMVE) (TFE/PMVE=32/68 in mole ratio) was fed so that the inside pressure became 8.0 kgf/cm$^2$G. Then 100 ml of an aqueous solution containing ammonium persulfate (APS) in a concentration of 27.9 mg/ml was fed with pressurized nitrogen to initiate a reaction.

With the advance of the polymerization, at the time when the inside pressure lowered to 7.0 kgf/cm$^2$G, a mixture comprising 13.62 g of diiodine compound I(CF$_2$)$_4$I and 117 g of an aqueous solution of 10% by weight of $C_7F_{15}COONH_4$ was fed with pressurized nitrogen. Then 60 g of TFE was fed with its self-pressure and 58 g of PMVE was fed under pressure by a plunger pump (TFE/PMVE=63/37 in mole ratio). After that, with the advance of the reaction, TFE and PMVE were fed under pressure in the same manner, and increasing and decreasing of the pressure were repeated between 7 kgf/cm$^2$G and 8 kgf/cm$^2$G.

At the time when a total feeding amount of TFE and PMVE reached 6,000 g sixteen hours after the initiation of the polymerization reaction, the autoclave was cooled and an un-reacted monomer was released to give an aqueous dispersion having a solid content of 18.16% by weight.

A part of the aqueous dispersion was sampled, frozen, coagulated and thawed, and a precipitated product was washed with water and vacuum-dried to give an elastomeric polymer. The polymer did not melt and a Mooney viscosity $ML_{1+10}$ (100° C.) could not be measured. An intrinsic viscosity "η" was 1.387 dl/g.

As a result of $^{19}$F-NMR analysis, monomer units of the polymer were TFE/PMVE=60/40 in % by mole, and Tg (center value) measured by DSC analysis was 2° C.

PREPARATION EXAMPLE 3

Synthesis of Fluorine-containing Multi-segment Polymer

A 3-liter stainless steel autoclave was charged with 349 g of the aqueous dispersion obtained in Preparation Example 1,685 g of pure water and 26.4 g of perfluoro(propyl vinyl ether) (PPVE). After the inside of the autoclave was replaced with nitrogen gas sufficiently, the inside temperature was maintained at 80° C. Tetrafluoroethylene (TFE) was fed with stirring at 400 rpm so that the inside pressure became 8.0 kgf/cm$^2$G.

A solution prepared by dissolving 10 mg of ammonium persulfate (APS) in 2 ml of water was fed with pressurized nitrogen to initiate a reaction.

With the advance of the polymerization reaction, since the inside pressure lowered, at the time when it lowered to 7.0 kgf/cm$^2$G, it was increased with TFE up to 8.0 kgf/cm$^2$G. Then increasing and decreasing of the pressure were repeated between 7 kg f/cm$^2$G and 8 kgf/cm$^2$G.

At the time when 189 g of TFE was consumed after the initiating of polymerization, supplying thereof was terminated, the autoclave was cooled and an un-reacted monomer was released to give 1,231 g of semi-transparent aqueous dispersion.

A solid content of the obtained aqueous dispersion was 20.2% by weight and a particle size measured by a dynamic light scattering method was 82.3 nm.

Calculated from the increased yield of polymer, a percentage of the crystalline fluorine-containing polymer chain segment (B) with respect to the whole polymer, that is, [(Yield of polymer obtained by post-polymerization)−(Yield of charged polymer)]÷(Yield of polymer obtained by post-polymerization)×100 was 75% by weight.

The obtained aqueous dispersion was frozen and coagulated, and the precipitated polymer was washed and dried to give a white solid.

The composition of the crystalline fluorine-containing polymer chain segment (B) in the obtained fluorine-containing multi-segment polymer was TFE/PPVE=97.1/2.9 in % by mole ratio according to $^{19}$F-NMR analysis. According to DSC analysis, the amorphous fluorine-containing polymer chain segment (A) did not have Tm and Tc and its Tg was 2° C. Tm and Tc of the crystalline fluorine-containing polymer chain segment (B) were 312.7° C. and 294.3° C., respectively. MFR of the segmented polymer was 11 g/10 min.

PREPARATION EXAMPLE 4

Synthesis of Fluorine-containing Multi-segment Polymer

A 6-liter stainless steel autoclave was charged with 3,000 g of the dispersion obtained in Preparation Example 1, and after the inside of the system was replaced with nitrogen gas sufficiently, the inside temperature of the system was maintained at 80° C. Tetrafluoroethylene (TFE) was fed under pressure with stirring at 600 rpm so that the inside pressure became 2.0 kgf/cm$^2$G.

Then a solution prepared by dissolving 10 mg of ammonium persulfate (APS) in 2 ml of water was fed with pressurized nitrogen to initiate a reaction.

With the advance of the polymerization reaction, since the inside pressure lowered, at the time when it lowered to 1.5 kgf/cm$^2$G, it was increased with TFE up to 2.0 kgf/cm$^2$G. Then increasing and decreasing of the pressure were repeated between 1.5 kgf/cm$^2$G and 2.0 kgf/cm$^2$G.

At the time when about 120 g of TFE was consumed after the initiation of polymerization, supplying thereof was terminated, the autoclave was cooled and an un-reacted monomer was released to give 3,080 g of semi-transparent aqueous dispersion.

A solid content of the obtained aqueous dispersion was 20.1% by weight. Calculated from the increased amount of polymer, a percentage of the crystalline fluorine-containing polymer chain segment (B) with respect to the whole polymer, that is, [(Yield of polymer obtained by post-polymerization)−(Yield of charged polymer)]÷(Yield of polymer obtained by post-polymerization)×100 was 12.7% by weight.

The obtained aqueous dispersion was frozen and coagulated, and the precipitated polymer was washed and dried to give a white solid.

According to DSC analysis, the amorphous fluorine-containing polymer chain segment (A) did not have Tm and Tc and its Tg was 2° C. Tm and Tc of the crystalline fluorine-containing polymer chain segment (B) were 323.4° C. and 280.9° C., respectively. A Mooney viscosity ML$_{1+10}$ (140° C.) of the fluorine-containing multi-segment polymer was 100.

PREPARATION EXAMPLE 5

Synthesis of Fluorine-containing Multi-segment Polymer

A 3-liter stainless steel autoclave was charged with 414 g of pure water and 665.5 g of the dispersion obtained in Preparation Example 1, and after the inside of the system was replaced with nitrogen gas sufficiently, the inside temperature of the system was maintained at 80° C. Tetrafluoroethylene (TFE) was fed under pressure with stirring at 400 rpm so that the inside pressure became 6.0 kgf/cm$^2$G.

Then a solution prepared by dissolving 10 mg of ammonium persulfate (APS) in 2 ml of water was fed with pressurized nitrogen to initiate a reaction.

With the advance of the polymerization reaction, since the inside pressure lowered, at the time when it lowered to 5.0 kgf/cm$^2$G, it was increased with TFE up to 6.0 kgf/cm$^2$G. Then increasing and decreasing of the pressure were repeated between 5.0 kgf/cm$^2$G and 6.0 kgf/cm$^2$G.

At the time when about 120 g of TFE was consumed after the initiation of polymerization, supplying thereof was terminated, the autoclave was cooled and an un-reacted monomer was released to give 1,183 g of semi-transparent aqueous dispersion.

A solid content of the obtained aqueous dispersion was 20.7% by weight and a particle size measured by a dynamic light scattering method was 58.7 nm.

Calculated from the increased amount of polymer, a percentage of the crystalline fluorine-containing polymer chain segment (B) with respect to the whole polymer, that is, [(Yield of polymer obtained by post-polymerization)−(Yield of charged polymer)]÷(Yield of polymer obtained by post-polymerization)×100 was 50.0% by weight.

The obtained aqueous dispersion was frozen and coagulated, and the precipitated polymer was washed and dried to give a white solid.

According to DSC analysis, the amorphous fluorine-containing polymer chain segment (A) did not have Tm and Tc and its Tg was 2° C. Tm and Tc of the crystalline fluorine-containing polymer chain segment (B) were 325.1° C. and 298.5° C., respectively. The fluorine-containing multi-segment polymer did not melt and a Mooney viscosity (140° C.) thereof could not be measured.

PREPARATION EXAMPLE 6

Synthesis of Fluorine-containing Multi-segment Polymer

A 3-liter stainless steel autoclave was charged with 332.6 g of pure water and 687 g of the dispersion obtained in Preparation Example 1, and after the inside of the system was replaced with nitrogen gas sufficiently, the inside temperature of the system was maintained at 80° C. Tetrafluoroethylene (TFE) was fed under pressure with stirring at 400 rpm so that the inside pressure became 6.0 kgf/cm$^2$G.

Then a solution prepared by dissolving 10 mg of ammonium persulfate (APS) in 2 ml of water was fed with pressurized nitrogen to initiate a reaction.

With the advance of the polymerization reaction, since the inside pressure lowered, at the time when it lowered to 5.0 kgf/cm$^2$G, it was increased with TFE up to 6.0 kgf/cm$^2$G. Then increasing and decreasing of the pressure were repeated between 5.0 kgf/cm$^2$G and 6.0 kgf/cm$^2$G.

At the time when about 180 g of TFE was consumed after the initiation of polymerization, supplying thereof was terminated, the autoclave was cooled and an un-reacted monomer was released to give 1,217 g of semi-transparent aqueous dispersion.

A solid content of the obtained aqueous dispersion was 19.7% by weight and a particle size measured by a dynamic light scattering method was 73.1 nm.

Calculated from the increased amount of polymer, a percentage of the crystalline fluorine-containing polymer chain segment (B) with respect to the whole polymer, that is, [(Yield of polymer obtained by post-polymerization)−(Yield of charged polymer)]÷(Yield of polymer obtained by post-polymerization)×100 was 75.0% by weight.

The obtained aqueous dispersion was frozen and coagulated, and the precipitated polymer was washed and dried to give a white solid.

According to DSC analysis, the amorphous fluorine-containing polymer chain segment (A) did not have Tm and Tc and its Tg was 2° C. Tm and Tc of the crystalline fluorine-containing polymer chain segment (B) were 325.5° C. and 307° C., respectively.

EXAMPLE 1

The agent for minimizing spherulite size which comprises a fluorine-containing elastomer prepared in Preparation Example 1 was melt-kneaded in an amount shown in Table 1 with 100 parts of melt-processable crystalline PFA (PPVE content: 4.6% by weight, average spherulite size: 30 μm, MFR: 1.2 g/10 min) to give a composition. Melt-kneading was carried out at 350° C. at 15 rpm for 10 minutes by pouring each component in Roller Mixer Model R-60H (capacity of mixer: about 60 cc) available from Toyo Seiki Kabushiki Kaisha.

Tm, Tc and average spherulite size of the obtained melt-kneaded product were determined in the manner mentioned above. The results are shown in Table 1.

COMPARATIVE EXAMPLE 1

A melt-kneaded product was prepared in the same manner as in Example 1 except that the minimizing agent was not blended, and Tm, Tc and average spherulite size were determined. The results are shown in Table 1.

COMPARATIVE EXAMPLE 2

A melt-kneaded product was prepared in the same manner as in Example 1 except that 1 part of low molecular weight PTFE (LUBRON L5 available from DAIKIN INDUSTRIES, LTD., Tm: 327.6° C., Tc: 310.9° C.) was blended instead of the minimizing agent of Preparation Example 1 on the basis of 100 parts of PFA, and Tm, Tc and average spherulite size were determined. The results are shown in Table 1.

TABLE 1

|  | Ex. 1 | | | Com. | Com. |
| --- | --- | --- | --- | --- | --- |
|  | 1-1 | 1-2 | 1-3 | Ex. 1 | Ex. 2 |
| Minimizing agent of spherulite size | | | | | |
| Kind | Prep. Ex. 1 | Prep. Ex. 1 | Prep. Ex. 1 | — | Low molecular weight PTFE |
| Adding amount (part) | 0.25 | 0.5 | 2 | — | 1 |
| Tm (° C.) | 304.4 | 304.4 | 305.7 | 311.7 | 305.4 |
| Tc (° C.) | 281.3 | 281.6 | 286.6 | 275.9 | 282.3 |
| Average spherulite size (μm) | 14 | 10 or less | 10 or less | 30 | 20 |

EXAMPLE 2

A melt-kneaded product was prepared in the same manner as in Example 1 except that the fluorine-containing elastomer obtained in Preparation Example 2 was used as the minimizing agent in an amount shown in Table 2 (based on 100 parts of PFA), and Tm, Tc and average spherulite size were determined. The results are shown in Table 2.

TABLE 2

|  | Ex. 2 | | |
| --- | --- | --- | --- |
|  | 2-1 | 2-2 | 2-3 |
| Minimizing agent of spherulite size | | | |
| Kind | Prep. Ex. 2 | Prep. Ex. 2 | Prep. Ex. 2 |
| Adding amount (part) | 1 | 2 | 6.7 |
| Tm (° C.) | 304.7 | 304.3 | 304.6 |
| Tc (° C.) | 282.3 | 281.6 | 282.3 |
| Average spherulite size (μm) | 20 | 10 or less | 10 or less |

EXAMPLE 3

A melt-kneaded product was prepared in the same manner as in Example 1 except that the fluorine-containing multi-segment polymer obtained in Preparation Example 3 was used as the minimizing agent in an amount shown in Table 3 (based on 100 parts of PFA), and Tm, Tc and average spherulite size were determined. The results are shown in Table 3.

TABLE 3

|  | Ex. 3 | |
| --- | --- | --- |
|  | 3-1 | 3-2 |
| Minimizing agent of spherulite size | | |
| Kind | Prep. Ex. 3 | Prep. Ex. 3 |
| Adding amount (part) | 1.3 | 6.7 |
| Tm (° C.) | 304.4 | 304.4 |
| Tc (° C.) | 281.3 | 281.6 |
| Average spherulite size (μm) | 10 | 10 or less |

EXAMPLE 4

A melt-kneaded product was prepared in the same manner as in Example 1 except that the fluorine-containing multi-segment polymer obtained in Preparation Example 4 was used as the minimizing agent in an amount shown in Table 4 (based on 100 parts of PFA), and Tm, Tc and average spherulite size were determined. The results are shown in Table 4.

TABLE 4

|  | Ex. 4 | | |
| --- | --- | --- | --- |
|  | 4-1 | 4-2 | 4-3 |
| Minimizing agent of spherulite size | | | |
| Kind | Prep. Ex. 4 | Prep. Ex. 4 | Prep. Ex. 4 |
| Adding amount (part) | 2.3 | 7.7 | 38.5 |
| Tm (° C.) | 304.3 | 304.3 | 305.4 |

TABLE 4-continued

|  | Ex. 4 | | |
| --- | --- | --- | --- |
|  | 4-1 | 4-2 | 4-3 |
| Tc (° C.) | 281.6 | 281.6 | 283.0 |
| Average spherulite size (μm) | 20 | 10 or less | 10 or less |

EXAMPLE 5

A melt-kneaded product was prepared in the same manner as in Example 1 except that the fluorine-containing multi-segment polymer obtained in Preparation Example 5 was used as the minimizing agent in an amount shown in Table 5 (based on 100 parts of PFA), and Tm, Tc and average spherulite size were determined. The results are shown in Table 5.

TABLE 5

|  | Ex. 5 | | |
| --- | --- | --- | --- |
|  | 5-1 | 5-2 | 5-3 |
| Minimizing agent of spherulite size |  |  |  |
| Kind | Prep. Ex. 5 | Prep. Ex. 5 | Prep. Ex. 5 |
| Adding amount (part) | 0.5 | 2 | 10 |
| Tm (° C.) | 305.7 | 304.7 | 304.3 |
| Tc (° C.) | 286.6 | 282.3 | 281.6 |
| Average spherulite size (μm) | 20 | 10 or less | 10 or less |

EXAMPLE 6

A melt-kneaded product was prepared in the same manner as in Example 1 except that the fluorine-containing multi-segment polymer obtained in Preparation Example 6 was used as the minimizing agent in an amount shown in Table 6 (based on 100 parts of PFA), and Tm, Tc and average spherulite size were determined. The results are shown in Table 6.

TABLE 6

|  | Ex. 6 | |
| --- | --- | --- |
|  | 6-1 | 6-2 |
| Minimizing agent of spherulite size |  |  |
| Kind | Prep. Ex. 6 | Prep. Ex. 6 |
| Adding amount (part) | 1.3 | 6.7 |
| Tm (° C.) | 304.7 | 306.4 |
| Tc (° C.) | 282.7 | 285.5 |
| Average spherulite size (μm) | 10 | 10 |

As shown in Examples 1 to 6 and Comparative Examples 1 and 2, when the minimizing agent of the present invention which mainly comprises an amorphous fluorine-containing polymer is used, the spherulite size can be minimized with a relatively small amount of the agent and a colorless transparent molded article can be obtained. On the other hand, when low molecular weight crystalline PTFE is used (Comparative Example 2), an effect of minimizing spherulite size can be obtained to a certain extent and through sight can be improved, but the obtained molded article is wholly whity.

EXAMPLE 7

A resin composition was obtained by blending 1 part of a minimizing agent which comprises the fluorine-containing multi-segment polymer produced in Preparation Example 5, into 100 parts of PFA (MFR: 1.4 g/10 min) used in Example 1 and then melt-extruding at 360° with a screw extruder (PCM46 available from Ikegai Kabushiki Kaisha). An average spherulite size of the extrudate was not more than 10 μm, and MFR thereof was 1.5 g/10 min. In case where PFA was used solely, an average spherulite size was 30 μm.

The obtained resin composition was extrusion-molded under the following conditions to give a tube having an outer diameter of 10.0 mm and a wall thickness of 1.0 mm.

Extruder: available from Tanabe Plastics Kikai Kabushiki Kaisha
Inner diameter of cylinder: 30 mm
Inner diameter of die: 20 mm
Outer diameter of mandrel: 13 mm
Set temperature:
　Rear part of cylinder: 330° C.
　Middle part of cylinder: 365° C.
　Front part of cylinder: 380° C.
　Adapter: 380° C.
　Die: 390° C.
Number of rotations of screw: 10 rpm
Inner diameter of sizing die: 10.0 mm
Line speed: 0.4 to 0.5 m/min A sample of about 5 mm square was cut from the obtained tube. An average spherulite size of inner surface of the tube was measured with a scanning electron microscope and a surface roughness was measured with a contact type surface roughness meter. The results are shown in Table 7.

COMPARATIVE EXAMPLE 3

An average spherulite size and a surface roughness of inner surface of the tube which was molded in the same manner as in Example 7 except that the minimizing agent was not used, were determined. The results are shown in Table 7.

EXAMPLE 8

A 50-liter vessel was charged with 20 liters of ion-exchanged water, 5 kg of crystalline PFA used in Example 1 and the aqueous dispersion of fluorine-containing multi-segment polymer prepared in Preparation Example 5 (polymer content: 250 g). Then a nitric acid was added thereto with stirring, followed by coagulating, washing and then drying at 150° C. for 12 hours. To the obtained dry powder was added the above-mentioned crystalline PFA so that the content of the fluorine-containing multi-segment polymer became 1 part on the basis of 100 parts of PFA, followed by mixing with Henschel mixer.

The composition was extrusion-molded in the same manner as in Example 7 to give a tube, and an average spherulite size and a surface roughness of inner surface of the tube were measured in the same manner as in Example 7. The results are shown in Table 7.

EXAMPLE 9

A resin composition was prepared by wet-mixing method in the same manner as in Example 8 except that the fluorine-containing elastomer of Preparation Example 2 was used, and then extrusion-molded into a tube. An average spherulite size and a surface roughness of inner surface of the obtained tube were measured. The results are shown in Table 7.

TABLE 7

| | Average spherulite size of inner surface of tube μm | Surface roughness | |
|---|---|---|---|
| | | Arithmetic mean roughness of inner surface of tube (Ra) μm | Maximum height of inner surface of tube (Ry) μm |
| Ex. 7 | 2.4 | 0.015 | 0.067 |
| Ex. 8 | 3.8 | 0.014 | 0.063 |
| Ex. 9 | 1.6 | 0.020 | 0.110 |
| Com Ex. 3 | 9.3 | 0.140 | 0.779 |

EXAMPLE 10

The fluorine-containing elastomer of Preparation Example 1 in a tray for the exclusive use therefor was put in a box type reaction oven, and the oven was sealed. After the inside of the oven was replaced with nitrogen gas sufficiently, a mixture gas of fluorine gas and nitrogen gas (fluorine gas content: 20% by weight) was flowed into the oven at a rate of 0.6 liter/min for five hours. The inside of the oven was adjusted to be under atmospheric pressure and maintained at 230° C.

After the reaction, heating was stopped and the mixture gas flow was changed over to nitrogen gas flow to remove fluorine gas sufficiently over about two hours.

A weight loss by heating of the obtained product treated with fluorine gas was measured by differential thermal analysis. As a result of the analysis, while 1% weight loss temperature was 334° C. prior to the treatment with fluorine gas, 1% weight loss temperature after the treatment with fluorine gas was 431° C., which shows that the treated product becomes thermally stable.

Also an iodine content by elementary analysis after the treatment with fluorine gas was below a detection limit.

EXAMPLE 11

Treatment with fluorine gas was carried out in the same manner as in Example 10 except that the fluorine-containing multi-segment polymer obtained in Preparation Example 4 was used, and then a thermogravimetric analysis was conducted.

While 1% weight loss temperature was 334° C. prior to the treatment with fluorine gas, 1% weight loss temperature after the treatment with fluorine gas was 387° C., which shows that the treated product becomes thermally stable.

Also an iodine content by elementary analysis after the treatment with fluorine gas was below a detection limit.

INDUSTRIAL APPLICABILITY

Since the minimizing agent of spherulite size of the present invention forms fine spherulites, the spherulites in the melt-molded articles such as a container and tube obtained by using it are very fine as compared with molded articles obtained from conventional PFA. Those molded articles are excellent in surface smoothness and transparency, and therefore have characteristics such that no contaminating substances are left remaining on their surfaces and a resolution of an image observed through those molded articles is excellent.

The minimizing agent which is used as an additive has heat resistance and chemical resistance equivalent to those of PFA and causes no problems such as contamination due to elution of contaminants in production of semi-conductors. Further the composition of the present invention has melt-moldability and mechanical properties equivalent to those of conventional PFA, and can be subjected to melt-molding such as extrusion molding, injection molding and compression molding entirely in the same manner as in conventional PFA.

What is claimed is:

1. A crystalline fluorine-containing resin composition comprising a melt-processable crystalline fluorine-containing resin and an agent for minimizing spherulite size of a crystalline fluorine-containing resin; said agent being a particle comprising a fluorine-containing multi-segment polymer comprising (A) an amophous fluorine-containing polymer chain segment and (B) a crystalline fluorine-containing polymer chain segment comprising 80 to 100% by mole of tetrafluoroethylene recurring unit and 0 to 20% by mole of a recurring unit represented by the formula (I):

$$CF_2=CF-R_f^1 \tag{I}$$

wherein $R_f^1$ is $CF_3$ or $OR_f^2$, in which $R_f^2$ is perfluoroalkyl group having 1 to 5 carbon atoms.

2. The crystalline fluorine-containing resin composition of claim 1, which contains 0.1 to 50 parts by weight of the agent for minimizing spherulite size on the basis of 100 parts by weight of the crystalline fluorine-containing resin.

3. The crystalline fluorine-containing resin composition of claim 1, wherein said crystalline fluorine-containing resin is a crystalline tetrafluoroethylene/perfluoro(alkyl vinyl ether) copolymer.

4. The crystalline fluorine-containing resin composition of claim 3, wherein said crystalline tetrafluoroethylene/perfluoro(alkyl vinyl ether) copolymer is a crystalline copolymer comprising 90 to 99% by weight of tetrafluoroethylene recurring unit and 10 to 1% by weight of perfluoro (alkyl vinyl ether) recurring unit.

5. The crystalline fluorine-containing resin composition of claim 1, wherein said crystalline fluorine-containing resin is a crystalline tetrafluoroethylene/perfluoro(alkyl vinyl ether) copolymer and said agent for minimizing spherulite size is a fluorine-containing multi-segment polymer comprising (A) an amorphous fluorine-containing polymer chain segment and (B) a crystalline fluorine-containing polymer chain segment consisting of tetrafluoroethylene recurring unit.

6. A molded article obtained by melt-molding the crystalline fluorine-containing resin composition of claim 1.

7. The molded article of claim 6, wherein an average size of spherulites is not more than 5 μm.

8. The molded article of claim 7, wherein the article is a tube.

9. The molded article of claim 7, wherein the article is a container.

10. The crystalline fluorine-containing resin composition of claim 1, wherein said crystalline fluorine-containing polymer chain segment (B) consists of tetrafluoroethylene recurring unit.

11. The crystalline fluorine-containing resin composition of claim 1, wherein said crystalline fluorine-containing polymer chain segment (B) is a crystalline segment comprising tetrafluoroethylene recurring unit and perfluoro(alkyl vinyl ether) recurring unit in an amount of not more than 4% by mole.

12. The crystalline fluorine-containing resin composition of claim 1, wherein said agent for minimizing spherulite size is subjected to fluorinating treatment.

* * * * *